Oct. 30, 1951  A. E. MARTOIS  2,573,212
PIPE TONGS
Filed March 12, 1946  3 Sheets-Sheet 2
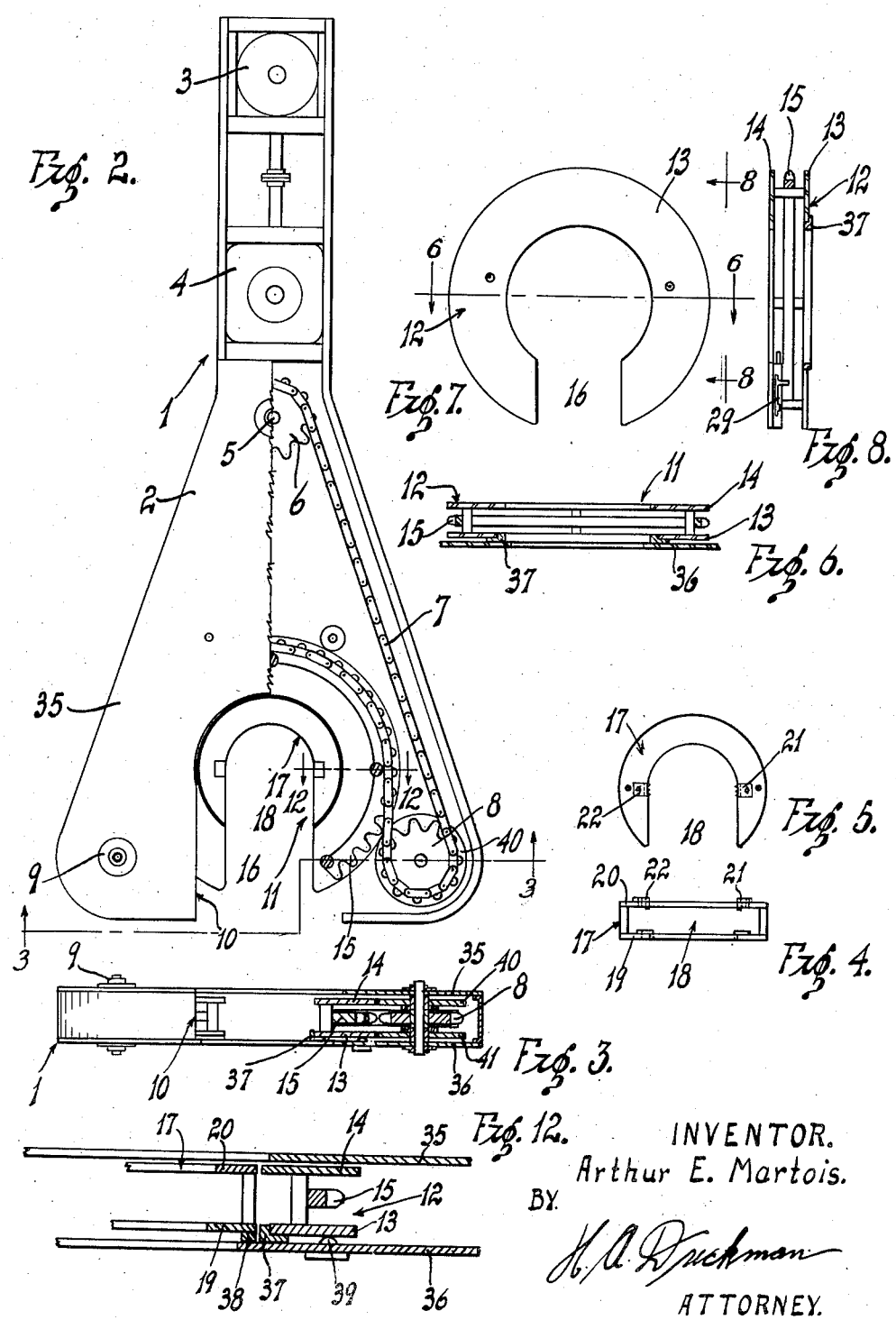
INVENTOR.
Arthur E. Martois.
BY
H. A. Druckman
ATTORNEY.

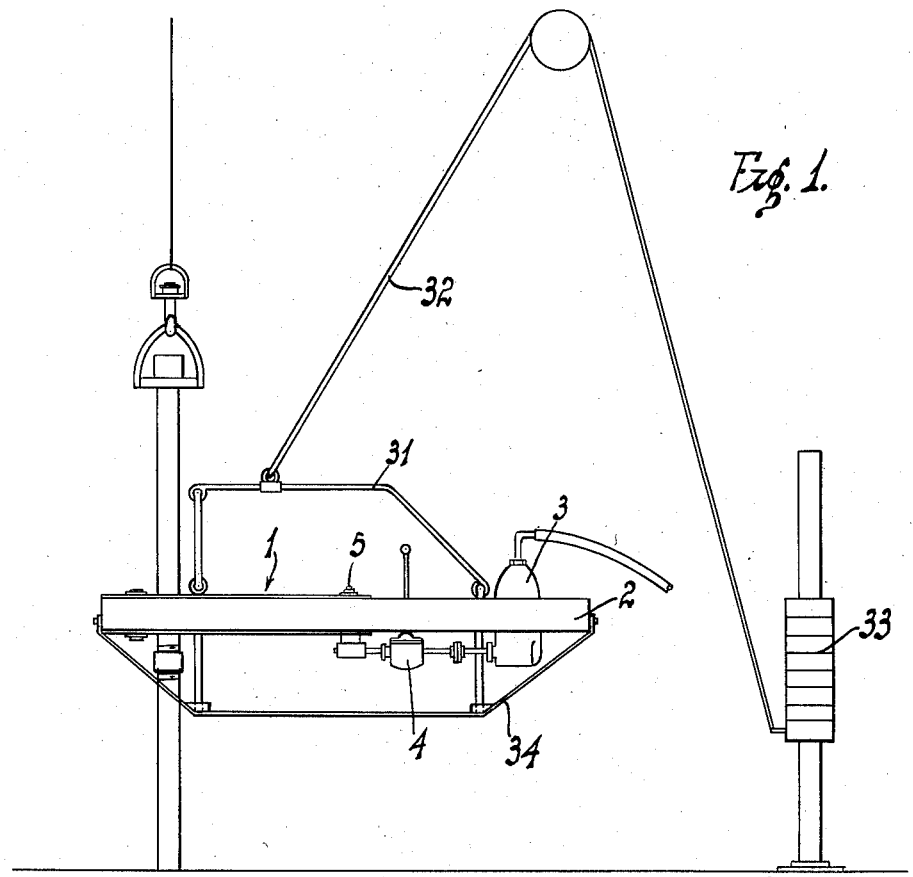

Oct. 30, 1951  A. E. MARTOIS  2,573,212
PIPE TONGS
Filed March 12, 1946  3 Sheets-Sheet 3
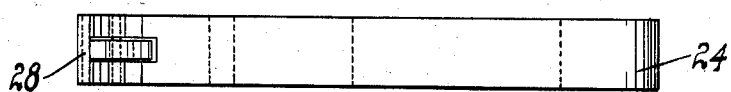
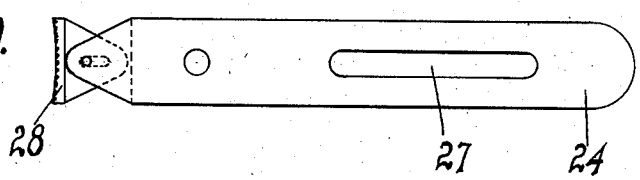
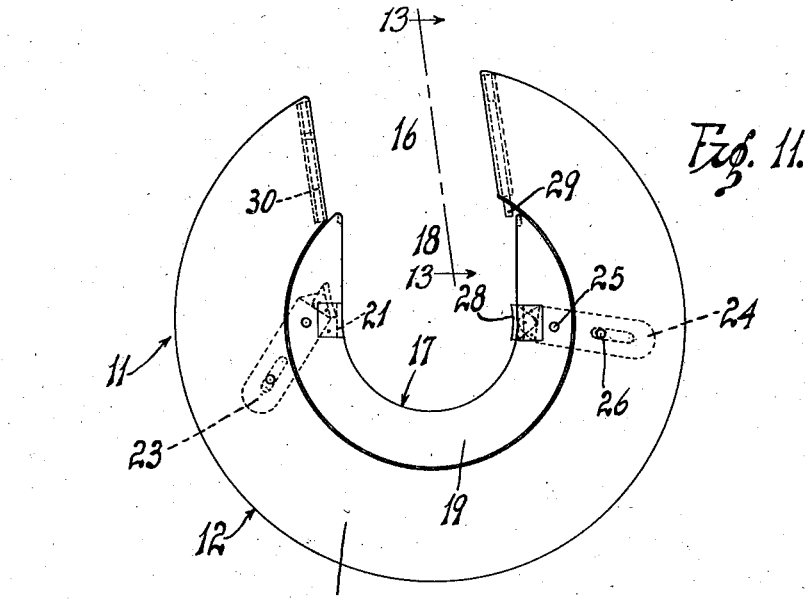
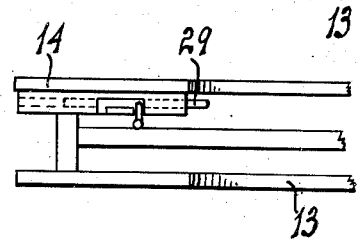
INVENTOR.
Arthur E. Martois.
BY
ATTORNEY.

Patented Oct. 30, 1951

2,573,212

UNITED STATES PATENT OFFICE 2,573,212

PIPE TONGS

Arthur E. Martois, Torrance, Calif.

Application March 12, 1946, Serial No. 653,852

10 Claims. (Cl. 255—35)

This invention relates to a pipe tongs, whereby well pipe or casing is threaded or unthreaded to insert or remove the pipe or casing from a well.

An object of my invention is to provide a power driven pipe tongs in which the pipe gripping element is rotated by a power driven chain, the chain being so arranged that it spans the pipe opening in the gripping mechanism so that an adequate number of teeth are always engaged by the chain when the gripping mechanism is being rotated.

Another object of my invention is to provide a novel pipe tongs which can rotate the pipe either right hand or left hand without having to change the driving dog or the gripping mechanism, or invert the pipe tongs, as was customary in devices heretofore in use.

A feature of my invention resides in the pipe gripping dogs, which are so mounted that a partial rotation of the master bushing in either direction will cause one of the pipe gripping dogs to engage the pipe.

Still another feature of my invention is to provide a novel pipe tongs of the character stated, which is adapted to be suspended in the derrick, and which can thus be easily swung into pipe engaging position or swung away from the pipe, as desired.

Other objects, advantages and features of invention may appear from the accompanying drawing, the subjoined detailed description and the appended claims.

In the drawing—

Figure 1 is a side elevation of my pipe tongs suspended in a derrick, the pipe and pipe lifting means being diagrammatically shown.

Figure 2 is a top plan view of my pipe tangs with parts broken away to show interior construction.

Figure 3 is a front elevation and partial sectional view taken on line 3—3 of Fig. 2.

Figure 4 is a side elevation of the pipe engaging bushing.

Figure 5 is a top plan view of the same.

Figure 6 is a transverse sectional view of the master bushing, taken on line 6—6 of Figure 7.

Figure 7 is a top plan view of the same.

Figure 8 is a side view of the same with parts broken away to show interior construction, as viewed from the arrows 8—8 in Figure 7.

Figure 9 is a side elevation of one of the pipe engaging dogs.

Figure 10 is a top plan view of the same.

Figure 11 is a top plan view of the pipe gripping mechanism.

Figure 12 is a fragmentary transverse sectional view of the master bushing and pipe engaging bushing, taken on line 12—12 of Figure 2.

Figure 13 is a fragmentary side view of the master bushing.

Referring more particularly to the drawing, my pipe tongs 1 consists of an elongated frame 2, in which are mounted the following units:

A driving motor 3, which may be either electrical, hydraulic or air, as desired. A speed changing transmission 4 is interposed between the motor 3 and a drive shaft 5. The transmission 4 enables the operator to control the speed of the drive shaft 5 with a constant speed of the motor 3. A driving sprocket 6 is attached to the shaft 5, and a chain 7 encircles the driving sprocket, and a pair of idler sprockets 8 and 9, the idler sprockets being mounted adjacent the forward edge of the frame 2. The frame 2 is also provided with a large recess 10, this recess extending inwardly from the front or operating edge of the tongs. A pipe gripping mechanism 11 is rotatably mounted in the frame 2 and also within the recess 10. The pipe gripping mechanism consists of an outer master bushing 12, which comprises upper and lower spaced plates 13, 14. A driving sprocket 15 is fixedly mounted between the plates 13, 14 and this sprocket is engaged by the chain 7. It will be noted from Figure 2 that the chain 7 engages the sprocket 15 over approximately 180°, and thus adequately spans the pipe opening 16 in the master bushing 12. There are always a sufficient number of teeth engaged by the chain 7 so that there is no unnecessary strain on the sprocket 15 while the opening 16 is passing over the engaging part of the chain.

A pipe engaging bushing 17 is mounted within the master bushing 12, and this pipe engaging bushing is also provided with a pipe opening 18, which matches with the pipe opening 16, and permits the complete entrance of the pipe to a position to be worked upon by the tongs. The pipe engaging bushing is also formed with upper and lower spaced plates 19 and 20, and the purpose of this spaced plate construction will be further described.

A pair of pipe engaging and toothed blocks 21, 22 are fixedly mounted on the pipe bushing 17 and are diametrically opposed. One pair of these blocks engage the pipe on either left hand or right hand rotation of the tool. A pair of cam levers 23, 24 are mounted one on each side of the pipe gripping mechanism, and are adapted to selectively engage the pipe, depending upon the direction of rotation of the gripping mechanism. The cam levers are identical in construction and are both mounted in the same manner. Therefor, only one mounting will be described in detail. The action of the cam lever presses the pipe against the blocks.

A pivot pin 25 extends through the cam lever and is journalled therein and this pin is fixed in the bushing thus pivotally attaching the cam lever to the pipe engaging bushing 17. A second pin 26 is fixed in the master bushing 12 and projects from the bushing into a slot 27 in the cam lever. The pin 26 extending into the slot 27 provides a drive for the pipe bushing 17, and also imparts a swinging movement to the cam lever, which swings the inner end of the cam lever into engagement with the pipe. A toothed dog 28 is pivotally attached to the inner end of the cam lever and grips the pipe when the cam lever is swung inwardly, as previously described. It will be evident from an examination of Figure 11 that when one cam lever is moved inwardly into engagement with the pipe, the other cam lever is rotated away from the pipe. On opposite rotation, an opposite action of the cam levers will occur.

After the pipe is made up, it is necessary to align the opening 16, 18 with the recess 10, so that the tongs can be removed from the pipe. This requires reverse rotation of the pipe gripping mechanism 11, and to prevent the pipe gripping dogs 23 or 24 from engaging the pipe and thus again unscrewing it, I provide a stop for the pipe bushing 17, which will prevent reverse movement of this pipe bushing on reverse rotation of the master bushing 12. These stops consist of pins 29, 30, one on each side of the opening 16 on the master bushing 12, and adapted to be manually pushed inwardly to engage either side of the pipe opening 18 of the pipe bushing 17. The pins 29 or 30 can be moved at the will of the operator, and merely prevent reverse movement of the bushing 17 and prevent one of the dogs 23 or 24 from inadvertently engaging the pipe.

The pipe tongs are suspended in the derrick by means of a bale 31, to which a cable 32 is attached. This cable in turn is counterbalanced by suitable weights 33, all of which is usual and well known in the art. A pair of skids 34 may be provided on the pipe tongs, and these skids are removably attached to the frame 2 so that the pipe tongs can be dragged over the floor of the derrick or onto a truck, when it is moved from place to place.

The master bushing is rotatably mounted between the upper and lower plates 35, 36 of the main frame 2. A ring bearing 37 is arranged on the lower plate 36 and serves to center the master bushing 12. The pipe engaging bushing 17 rests on a ring 38, which may be welded to the bottom of the bushing 17 or may be an integral part therof. The ring 38 also rests on the bottom plate 36. As additional support, a plurality of ballbearings 39 may be provided on the bottom plate 36, and these bearings engage the bottom of the master bushing 12, thus decreasing the frictional resistance to the free rotation of the master bushing.

To take the side thrust on the master bushing 12 and also to center the bushing, I provide thrust rollers 40, 41, which are journaled on the pins of the sprockets 8 and 9.

In operation, the pipe tongs are supported in a horizontal position as shown in Figure 1. The opening 16 extends forwardly and the corresponding opening 18 in the bushing 17 is aligned therewith. The pipe can then enter until it engages the bushing 17. The motor 3 is now started, driving the chain 7 and this causes the master bushing 12 to rotate and carrying with it the pipe engaging bushing 17. Rotation of the master bushing 12 will cause one of the levers 24 to swing around its pivot pin 25 until the dog 28 is pressed against the pipe and then pushing this pipe over against the oppositely positioned block 21 or 22. Thus, the pipe is gripped within the bushing 17 and between the block 21 or 22 and opposite the dog 28. When one lever 24 is moved to engage the pipe, the opposite lever will be swung away from the pipe, as shown in Figure 11. A slight rotation between the bushings 12 and 17 will permit this swinging movement of the levers 23 and 24 above described.

After the pipe is made up, it is necessary to align the opening 16—18 with the recess 10 and to prevent movement of the bushing 17 during reverse movement of the pipe gripping mechanism, I provide a stop 29, which stop pin engages the edge of the bushing 17 and prevents relative rotational movement between the bushings 12 and 17.

Having described my invention, I claim:

1. In a pipe tongs, a master bushing rotatably mounted in the tongs, said master bushing having a pipe receiving opening therein, power means driving said bushing, a pipe engaging bushing mounted for partial rotation within the master bushing, said pipe engaging bushing having a pipe receiving opening therein, a lever, means pivotally mounting the lever in the pipe bushing, and means slidably connecting the lever to the master bushing, and a pipe engaging dog mounted on said lever.

2. In a pipe tongs, a master bushing rotatably mounted in the tongs, said master bushing having a pipe receiving opening therein, power means driving said bushing, a pipe engaging bushing mounted for partial rotation within the master bushing, said pipe engaging bushing having a pipe receiving opening therein, a lever, means pivotally mounting the lever in the pipe bushing, and means slidably connecting the lever to the master bushing, there being two levers on the pipe bushing, diametrically spaced, a dog on each lever, either of said dogs engaging the pipe, one dog engaging the pipe and the other being retracted during rotation of said bushings in one direction.

3. In a pipe tongs, a master bushing rotatably mounted in the tongs, power means driving said bushing, said bushing having a pipe receiving opening therein, a pipe engaging bushing mounted for partial rotation within the master bushing, said pipe engaging bushing having a pipe receiving opening therein, said master bushing comprising upper and lower spaced plates, said pipe engaging bushing consisting of upper and lower spaced plates, a lever, means pivotally mounting the lever in the pipe engaging bushing and arranged between the upper and lower plates of said pipe engaging bushing, and means slidably connecting the lever to the master bushing, and a dog on the inner end of the lever.

4. In a pipe tongs, a master bushing rotatably mounted in the tongs, power means driving said bushing, said bushing having a pipe receiving opening therein, a pipe engaging bushing mounted for partial rotation within the master bushing, said pipe engaging bushing having a pipe receiving opening therein, said master bushing comprising upper and lower spaced plates, said pipe engaging bushing consisting of upper and lower spaced plates, a lever, means pivotally mounting the lever in the pipe engaging bushing and arranged between the upper and lower plates of said pipe engaging means, said lever having an elongated slot therein, and a pin in the master bushing extending through said slot, and a dog on the inner end of said lever.

5. In a pipe tongs, a master bushing rotatably mounted in the tongs, said master bushing having a pipe receiving opening therein, power means driving said bushing, a pipe engaging bushing mounted for partial rotation within the master bushing, said pipe engaging bushing having a pipe receiving opening therein, a lever, means pivotally mounting the lever in the pipe bushing, and means slidably connecting the lever to the master bushing, a dog on said lever, a stop on the master bushing engageable with the pipe bushing to prevent movement of said pipe bushing beyond open position in one direction of rotation of the master bushing.

6. In a pipe tongs, a master bushing rotatably mounted in the tongs, said master bushing having a pipe receiving opening therein, power means driving said bushing, a pipe engaging bushing mounted for partial rotation within the master bushing, said pipe engaging bushing having a pipe receiving opening therein, levers, means pivotally mounting the lever in the pipe bushing, and means slidably connecting the lever to the master bushing, there being two levers on the pipe bushing, diametrically spaced, a dog on each lever, either of said dogs engaging the pipe, one dog engaging the pipe and the other being retracted during rotation of said bushings in one direction, a stop on the master bushing engageable with the pipe bushing to prevent movement of said pipe bushing beyond open position in one direction of rotation of the master bushing.

7. In a pipe tongs including a frame, a master bushing journaled in the frame, a driving sprocket on the master bushing, a pair of idler sprockets journaled in the frame, one on each side of the master bushing, a drive shaft, a sprocket on the drive shaft and a chain partly encircling all of said sprockets, said chain engaging the driving sprocket on the bushing over approximately 180°, motor drive means rotating the drive shaft, said master bushing having a pipe receiving opening therein, a pipe bushing mounted for partial rotation in the master bushing, said pipe bushing having a pipe receiving opening therein, and a suspending bale on the frame whereby the tongs are suspended in a derrick, a lever, means pivotally attaching the lever to the pipe bushing, and means slidably connecting the lever to the master bushing, and a dog mounted on the lever.

8. In a pipe tongs including a frame, a master bushing journaled in the frame, a driving sprocket on the master bushing, a pair of idler sprockets journaled in the frame, one on each side of the master bushing, a drive shaft, a sprocket on the drive shaft and a chain partly encircling all of said sprockets, said chain engaging the driving sprocket on the bushing over approximately 180°, motor drive means rotating the drive shaft, said master bushing having a pipe receiving opening therein, a pipe bushing mounted for partial rotation in the master bushing, said pipe bushing having a pipe receiving opening therein, and a suspending bale on the frame whereby the tongs are suspended in a derrick, and a variable speed transmission between the motor and the drive shaft, means pivotally attaching the lever to the pipe bushing, and means slidably connecting the lever to the master bushing, and a dog mounted on the lever.

9. In a pipe tongs including a frame, a master bushing journaled in the frame, a driving sprocket on the master bushing, a pair of idler sprockets journaled in the frame, one on each side of the master bushing, a drive shaft, a sprocket on the drive shaft and a chain partly encircling all of said sprockets, said chain engaging the driving sprocket on the bushing over approximately 180°, motor drive means rotating the drive shaft, said master bushing having a pipe receiving opening therein, a pipe bushing mounted for partial rotation in the master bushing, said pipe bushing having a pipe receiving opening therein, and a suspending bale on the frame whereby the tongs are suspended in a derrick, a lever, means pivotally attaching the lever to the pipe bushing, and means slidably connecting the lever to the master bushing a dog mounted on the lever, and stop means on the master bushing engageable with the pipe bushing to prevent movement of the pipe bushing beyond open position in one direction of rotation of the bushings.

10. In a pipe tongs, a master bushing rotatably mounted in the tongs, power means rotating said bushing, a pipe engaging bushing mounted for partial rotation within the master bushing, a pair of oppositely arranged levers, means pivotly attaching the levers to one of said bushings, and means slidably attaching the lever to the other bushing, and a pipe engaging dog on each lever.

ARTHUR E. MARTOIS.

REFERENCES CITED

The following references are of record in the file of this patent:

UNITED STATES PATENTS

| Number | Name | Date |
|---|---|---|
| 1,110,639 | Moore | Sept. 15, 1914 |
| 1,505,007 | Cox et al. | Aug. 12, 1924 |
| 1,511,850 | Thrift | Oct. 14, 1924 |
| 1,514,195 | Brandon | Nov. 4, 1924 |
| 1,617,509 | Thrift | Feb. 15, 1927 |
| 2,263,267 | Franklin | Nov. 18, 1941 |
| 2,317,306 | Smith | Apr. 20, 1943 |
| 2,550,045 | Hetre | Apr. 24, 1951 |